(12) United States Patent
Porteous

(10) Patent No.: US 6,874,742 B2
(45) Date of Patent: Apr. 5, 2005

(54) CLAMP DEVICE

(75) Inventor: David Leslie Porteous, Northland (NZ)

(73) Assignee: Cleco New Zealand Limited, Northland (NZ)

( * ) Notice: Subject to any disclaimer, the term of this patent is extended or adjusted under 35 U.S.C. 154(b) by 0 days.

(21) Appl. No.: 10/255,701

(22) Filed: Sep. 27, 2002

(65) Prior Publication Data

US 2003/0057338 A1 Mar. 27, 2003

(30) Foreign Application Priority Data

Sep. 27, 2001 (NZ) .................................. 514441

(51) Int. Cl.[7] ............................ A47B 96/06; E04G 5/06
(52) U.S. Cl. .............................. 248/231.41; 248/316.4
(58) Field of Search .......................... 211/123; 482/40, 482/104, 38, 904; 248/231.31, 231.41, 316.2, 214, 228.2, 228.5, 217.1, 228.3, 231.44, 316.4, 610; 472/118, 125; 297/277; 269/166, 169

(56) References Cited

U.S. PATENT DOCUMENTS

| | | | |
|---|---|---|---|
| 410,815 A | * | 9/1889 | Tarbell |
| 705,860 A | * | 7/1902 | O'Brien |
| 1,349,225 A | * | 8/1920 | Rosenblum |
| 1,369,747 A | * | 2/1921 | Jordan |
| 1,493,913 A | * | 5/1924 | Whiteside |
| 4,042,264 A | | 8/1977 | Shumer |
| 5,197,360 A | | 3/1993 | Wooster, Jr. |
| 5,222,420 A | * | 6/1993 | Sorensen ................... 81/487 |
| 5,413,298 A | | 5/1995 | Perreault |
| 5,775,680 A | * | 7/1998 | Sorensen .................. 269/170 |
| 6,578,837 B1 | * | 6/2003 | Blank et al. .................. 269/6 |

OTHER PUBLICATIONS

The Tool Catalogue, Axminster Power Tool Centre, Sep. 1995, pp. 71–73.
Toolmail catalogue, p. 73.
Wilton Tool Group extract from website.
Toolbank Express (Handyman), extracts from website.
Groz Net Industries, extract from website.
Diygear, extracts from website.

* cited by examiner

Primary Examiner—Gwendolyn Baxter
(74) Attorney, Agent, or Firm—Young & Thompson

(57) ABSTRACT

A clamp device which is intended for clamping to the top of a door frame so that e.g. a swing can be suspended therefrom. The clamp device includes an elongate bar member 12. Slidably mounted on the bar 12 is a first engagement element 11 and a second engagement element 13. In use the shoulders 11a, 13a of the engagement elements 11, 13 hook over the top of the architrave of the door frame and the engagement elements 11, 13 clamp the door frame therebetween. The engagement element 13 is fixed in place on the bar 12 and the engagement element 11 is adjustable but lockable in the clamping position by a grab plate 21 engaged with the first engagement 11 by adjustment shaft 22. Mountings 28 are provided at each end of the bar 12 for attachment of the suspension cords of e.g. a swing.

14 Claims, 6 Drawing Sheets

US 6,874,742 B2

CLAMP DEVICE

BACKGROUND OF THE INVENTION

The present invention relates to a clamp device, more particularly a clamp device suitable for suspending a child's swing from a doorway in a building.

The clamp device of the present invention has been developed for use with a swing such as that described by International Patent Application number PCT/NZ94/00058. This particular swing includes four cord elements from which the swing hangs. The cords must be fixed to a suitably stable structure such as an outdoor frame means.

An investigation conducted to determine whether an indoor swing arrangement existed revealed only one product. This design incorporated an expanding bar fitted across an entire doorway for use with a conventional swing (which has only two suspended cords with the swing positioned therebetween). The bar was prone to slipping when in use.

Another related product is a 'baby bouncer' type product which uses an elastic or spring biased harness to allow a baby to 'jump' in an up and down movement. This does not involve a swinging motion.

SUMMARY OF THE INVENTION

It is therefore an object of the present invention to provide a clamping device suitable for use with an indoor mounted swing.

In one broad aspect of the invention there is provided a clamp device including an elongate member, slidably mounted on the elongate member is a first engagement means for abutting to an object to be clamped, said first engagement means including a locking means for removably stalling said engagement means upon said elongate member, said clamp device also including a second engagement means for clamping between it and the first engagement means the object to be clamped.

BRIEF DESCRIPTION OF THE DRAWINGS

The clamp device according to the present invention will now be further described with reference to the accompanying drawings, in which.

DETAILED DESCRIPTION OF PREFERRED EMBODIMENTS

Figure 1:
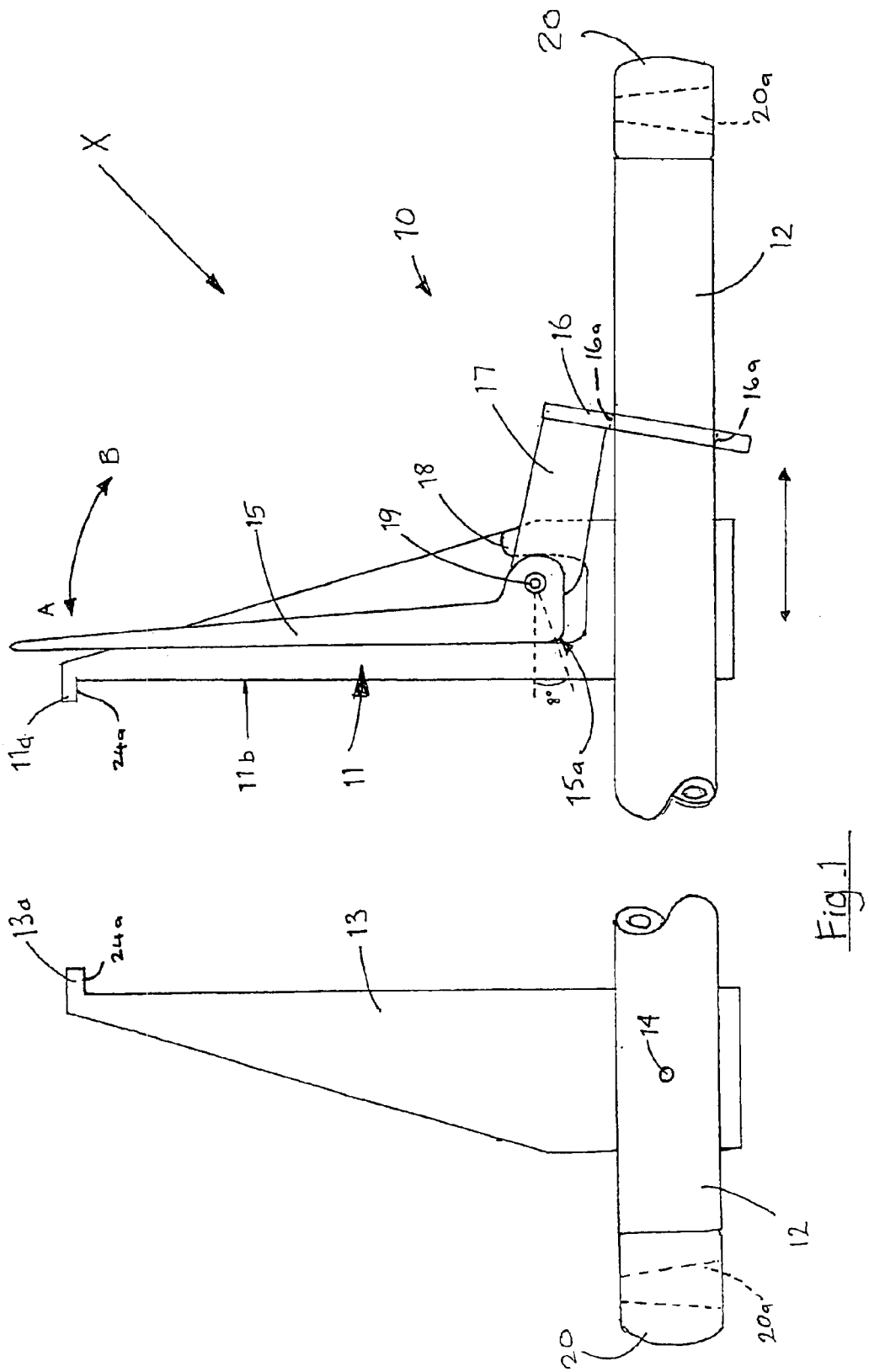
FIG. 1 is a side elevation view showing partial detail of a clamp device according to a first embodiment of the present invention.

The clamp device 10 according to a first embodiment as seen in its entirety in FIG. 1 is principally comprised of a first engagement element 11, which is slidingly located upon a tubular cross member or bar 12. A second engagement element 13 is fixed to the bar 12 by a rivet or like fastener 14.

Each engagement element 11, 13 includes a flange 11a, 13a for location over the top edge surface of an architrave or like edge of opposite sides of a conventional doorway (not illustrated).

When the second engagement element 13 is in place with engagement surface 24a of flange 13a thereof abutting a face surface of a top of a door frame and the flange 13a hooked over the door frame/architrave, first engagement element 11 may be slid along bar 12 so that its engagement surface 11a can abut the other face surface of door frame/architrave from the other side of the doorway. The flange 11a will similarly hook over the top frame/architrave on said other side of the doorway.

To keep the first and second engagement elements in clamping contact with the door frames/architraves the clamp device 10 must be locked in place. This is achieved by a 'clamping means' activated by lever 15. The action of the clamping means is hereinafter described.

Movement of lever 15 is best illustrated by FIG. 1 wherein lever 15 can move in the movement range shown by a directional arrow between positions A and B. The clamping means is shown in the 'locked' or "A" position in FIG. 1.

The principle working components of the first embodiment of the clamping means are the lever 15, pivotally attached to a grab plate 16 via a connector element 17. Maintaining lever 15 within the first engagement element 11 is a shoulder means 18, best seen in FIG. 2.

The lever 15 is pivotally attached to the connector element 17 by a roller pin (this has a split down one side) 19. The roller pin 19 does not extend into the first engagement element 11 leaving lever 15 and connector 17/grab plate 16 'free-floating' and restrained within first engagement element 11 only by shoulders 18.

When unlocked (lever 15 is pulled toward B), first engagement element 11 and the associated clamping means are free to slide along bar 12. This allows adjustment of the distance between the opposed surfaces of elements 11 and 13 to accommodate different thicknesses of door frame.

When the abutting surface 11b of first engagement element 11 is pressed against a door frame (not illustrated by the drawings) and the abutting surface 13b of the second engagement element is pressed against the opposite side of the door frame the lever 15 may be "flipped back" in the direction A. Pressure against shoulder 18 and the manipulation at grab plate 16 (formed with a through hole to surround bar 12) 'locks' the clamping means by virtue of grab plate 16 gripping bar 12. This locking effect is achieved by the plane of grab plate 16 being inclined to the longitudinal length of bar 12 so that effectively the top and bottom edges of opening 16a in plate 16 grip the bar 12 thus wedging the plate in position.

Preventing the lever 15 flipping back toward B is the off-centre arrangement of lever 15 in relation to the pivot point (pin 19) and the rounded edge 15a at the bottom of lever 15. Rounded edge 15a is preferably approximately 8° below the pivot pin. This causes a latching or locking effect. In other words, when the lever is moved toward A the tightest squeezing is 8° before vertical and when vertical the lever is self latched. The amount of "squeeze force" is slightly reduced at the last portion of movement between 8° and vertical.

In the preferred form of the first embodiment of the invention the first and second engagement elements 11, 13 are preferably produced from nylon for solidity and self lubrication. The lever 15 is preferably produced from polyethylene, allowing some 'give' for the locking action. Grab plate 16 is preferably made from spring steel to achieve the desired non-slip or wedging effect on bar 12. The connector element 17 (welded to grab plate 16) is preferably stainless steel.

Figure 2:
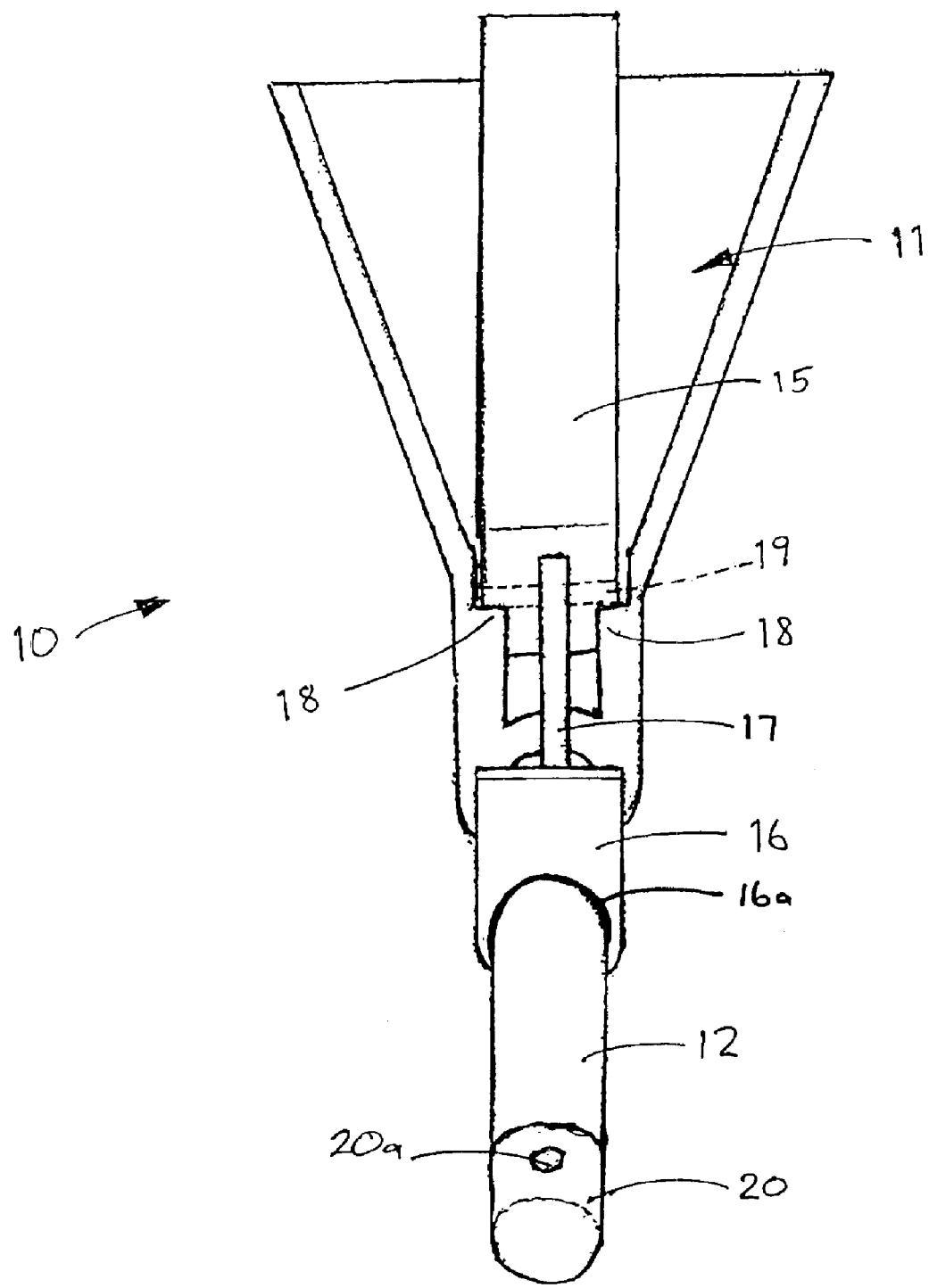
FIG. 2 is a perspective view from the direction of arrow X in FIG. 1.

As shown best by FIG. 2 the frontal appearance of engagement element 11 includes a widened upper portion to provide more surface area abutting the doorway and a greater width for flange 11a (not seen in FIG. 2) to hook onto the architrave.

Also shown by the drawings is a rope holder 20 including a tapered hole 20a. The rope holder(s) 20 (located at each end of bar 12) receives the front and back cords suspending the swing (not illustrated). It will be appreciated that two clamping devices according to the present invention will be required to suspend a swing as described by PCT/NZ94/00058. The intended swing movement is as shown by the lower arrow of FIG. 1 (which also indicates the sliding adjustment of first engagement means 11).

The adjustable nature provides compatibility with most door types or similar structures.

Figure 3:
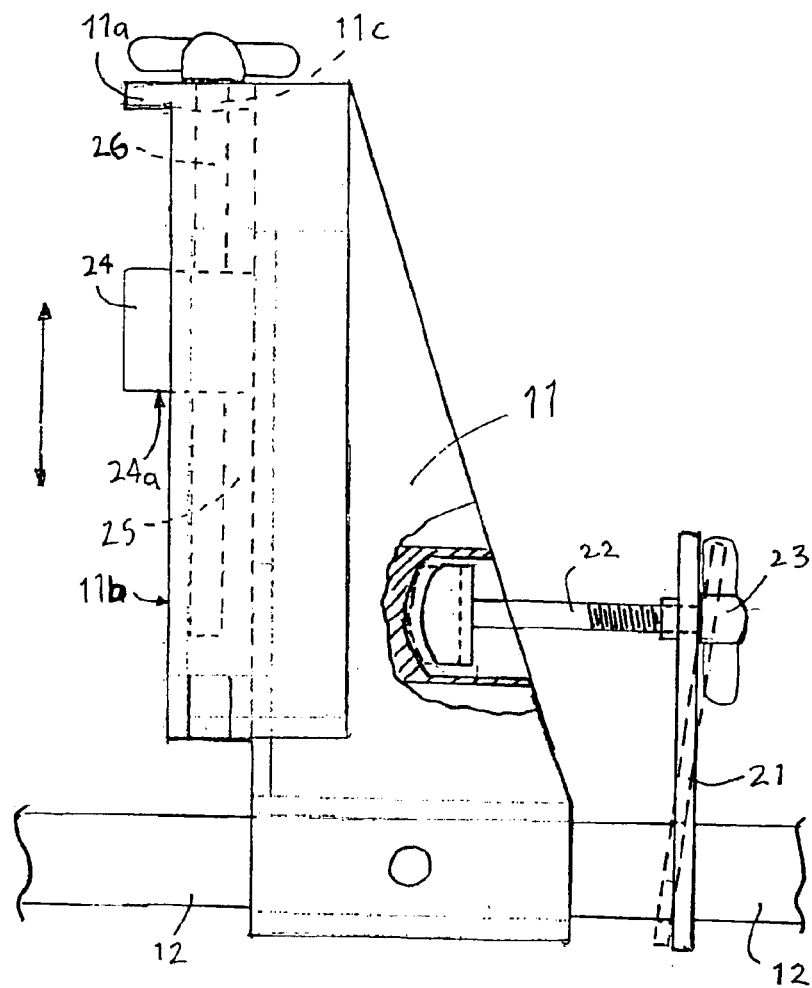
FIG. 3 is a partial side elevation view of a second embodiment of the clamp device according to the present invention.
Figure 4:
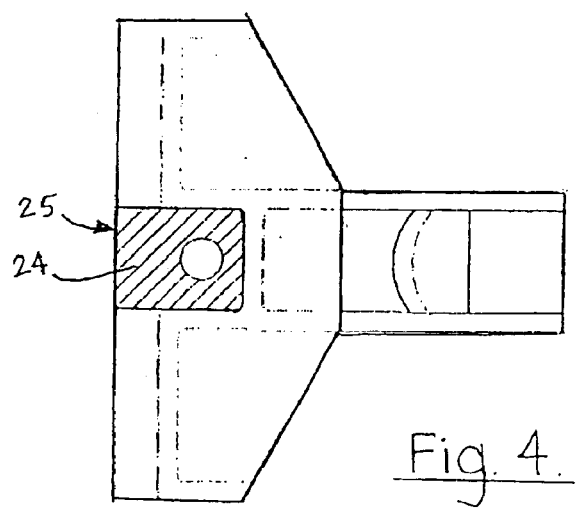
FIG. 4 is a plan view of the first engagement means of the second embodiment.
Figure 5:
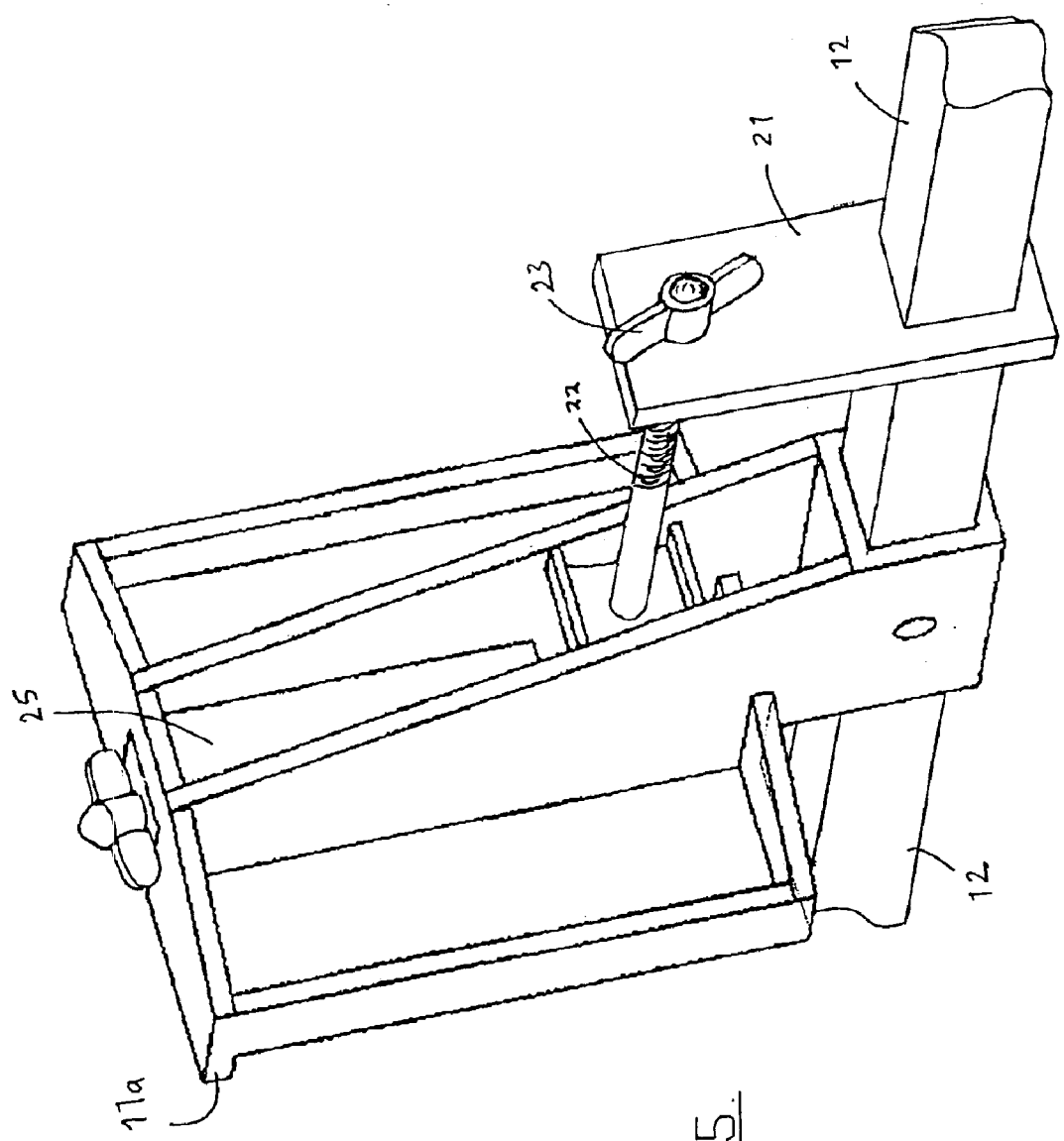
FIG. 5 is a rear perspective view of the first engagement means of the second embodiment.

FIGS. 3 to 5 illustrate a second embodiment of the clamp device according to the invention.

It has been observed that the forward and reverse action of a child's swing can cause 'crabbing' on a clamp bracket that only applies horizontal pressure (as in first embodiment) to the door frame. Therefore, the second embodiment provides a vertical tensioner element in addition to the horizontal clamping action.

Horizontal pressure is secured in a simpler arrangement to that of the first embodiment, namely a grab plate 21 mounted about bar 12 (which in the second embodiment has a square cross section). Grab plate 21 is tensioned to first engagement means 11 by a threaded element 22 embedded or otherwise held in engagement means 11. A wingnut 23 or similar applies pressure to the upper end of plate 21 that in turn locks it to bar 12.

Thus, as shown the threaded element 22 can be a shaft which engages at one end with the first engagement element 11. Shaft 22 is free to rotate relative to engagement. The shaft 22 is threaded (22a) at least at its distal end and passes through a threaded boss 21a fixed to plate 21. Wing nut 23 is fixed to the distal end of shaft 22 so that the shaft can be rotated.

Consequently, when the engagement elements 11, 13 are in contact with the opposing faces of the top part e.g. architraves of the door frame the wing nut 23 can be rotated which causes the shaft to rotate in boss 21a.

Because first engagement element 11 is abutting the door frame the rotation of shaft 22 causes plate 21 to tilt (see dotted detail in FIG. 3)thereby causing the plate to grip the bar 12 as previously described. Once the plate 21 has become wedged in place any further rotation of wing nut 23 further increases the contact or clamping pressure between the engagement elements 11 and 13 and the door frame.

Vertical pressure is applied to an architrave (not illustrated) by capturing said architrave between bar 12 and a lower protruding edge or shoulder 24a of vertically slidable block 24. Block 24 is mounted in a channel 25 of the engagement wall surface 11b of first engagement means 11. Block 24 is then screwed down by a threaded member 26 that passes through a fixed part 11c of engagement means 11 so it moves in the vertical plane relative to engagement means 11. When shoulder 24a is firmly engaged with the top of an architrave and the bottom of the architrave in contact with the upper surface of bar 12, the clamp means 10 is vertically tensioned.

When a swing is mounted by suitable means to each end of bar 12 the combination clamping of the door frame vertically between shoulder 24a and bar 12 and horizontally between engagement surfaces 11b and 13b prevents any crabbing being caused by a forward/reverse action in the swing.

The maximum dimension between bar 12 and block 24 will limit the architrave size. It is preferred that the movement will be up to 110 mm and that the architrave provide a lip of at least 7 mm deep to "hook" to. Preferable 7 mm is the protruding depth of shoulder 24a.

Figure 7:
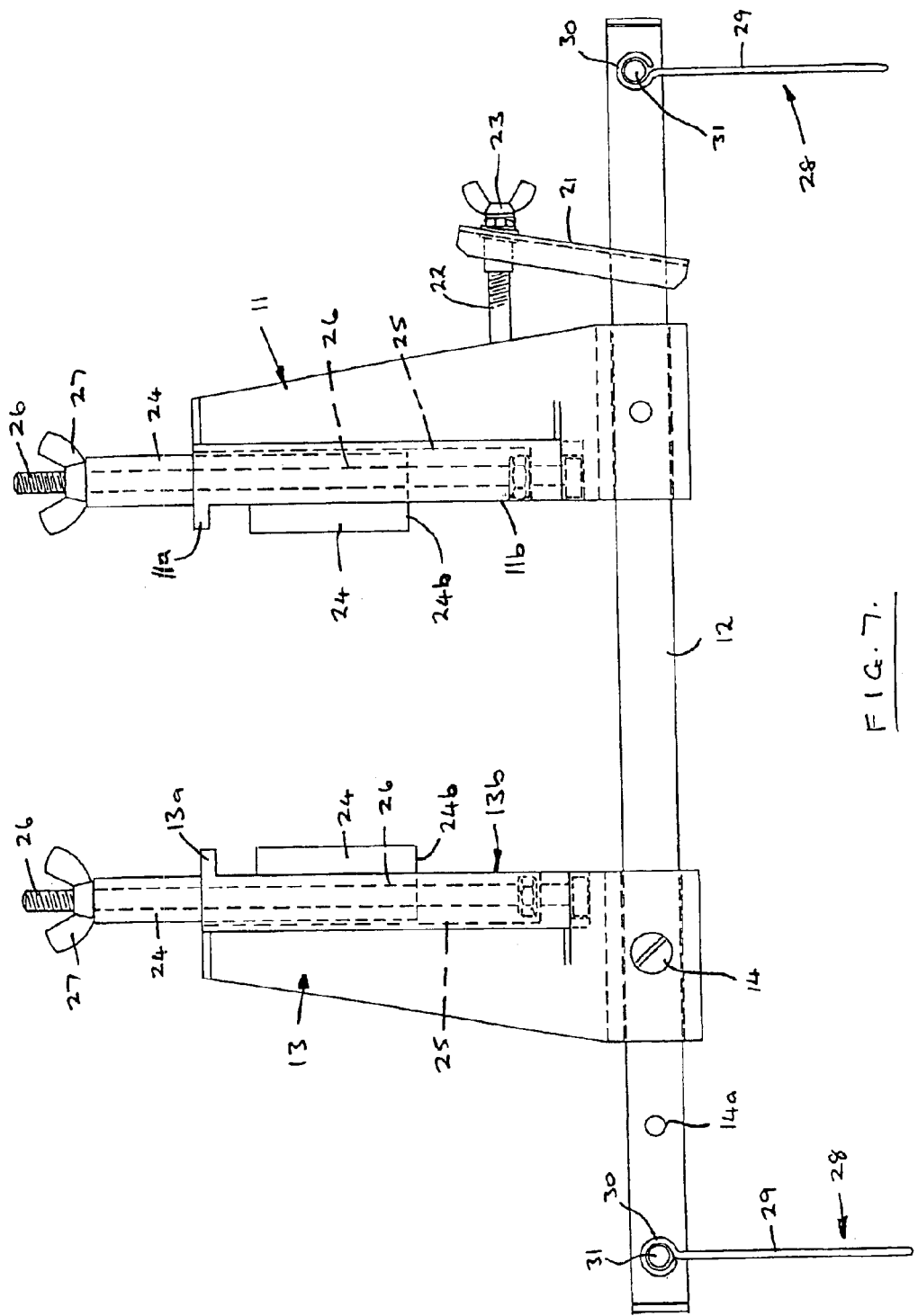
FIG. 7 is a side elevation view of the third embodiment.

As with the first embodiment, and as shown in FIG. 7, a second engagement means 13 is fixed to bar 12. The second engagement means also has the vertical tensioning means provided by block 24 in channel 25, adjusted by threaded element 26. As shown second engagement means can be adjustably located in position on bar 12 by a fastener 14 which can be engaged through a selected one of a plurality of holes 14a in bar 12.

Figure 6:
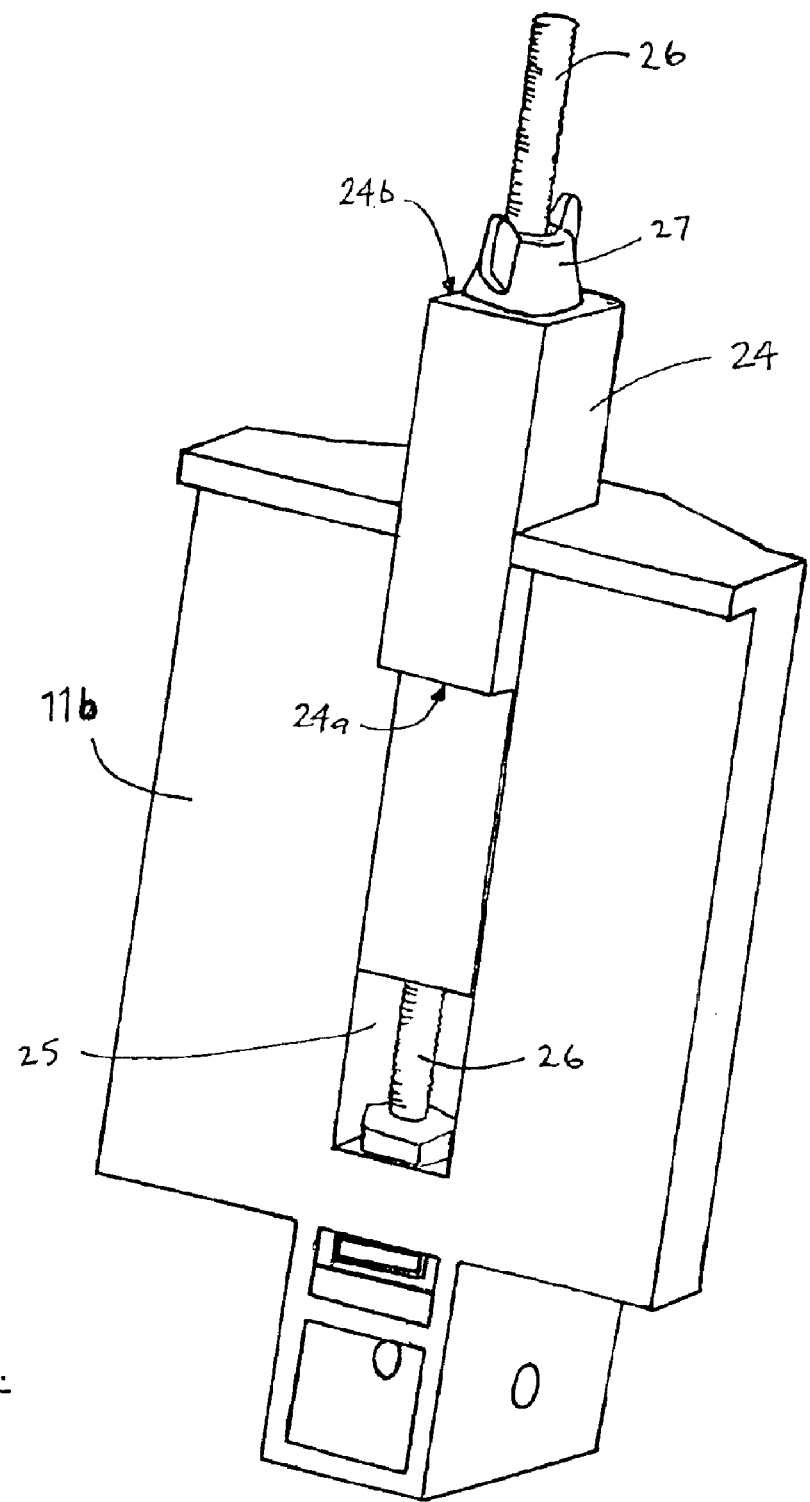
FIG. 6 is a general (frontal) partial perspective of a third embodiment of the clamp device.

FIGS. 6 and 7 illustrate a variation on the second embodiment. Channel 25 is clearly visible within which slides an elongate block 24. Unlike the embodiment of FIGS. 3, 4 and 5 block 24 includes a stepped portion that provides the protruding architrave contact surface 24a.

Furthermore, block 24 is arranged to slide on threaded member 26, i.e. it does not have an internal thread itself. Once engaged with an architrave (against surface 24a) a wingnut 27 is downwardly tightened to capture an architrave between bar 12 (not illustrated) and edge 24a.

The situation of block 24 as illustrated by FIG. 6 provides for clamping to a wide architrave. However, for smaller architraves block 24 can be removed from threaded element 26 and reversed such that 'top' surface 24b becomes the edge that contacts the architrave (see FIG. 7).

An alternative mounting for the suspension cord of e.g. a swing is shown in FIG. 7. The mounting 28 is a substantially U or V shaped member 29 which can, for example, be formed from a length of steel wire. The end of each leg of the U or V shape has an annular form 30 which rotatably engages on a pin 31 which projects from each of opposed sides of bar 12. An annular form is thus located on a pin on each side of the bar 12.

The clamp devices as herein described are also applicable to other situations such as the fixture of an indoor basketball hoop etc.

The clamp device of the present invention is thus adapted for ease of fitting by a child's supervisor and has been found to provide a secure and safe fitting within a doorway.

What is claimed:

1. A clamp device including an elongate member, slidably mounted on the elongate member is a first engagement element for, in use, abutting a surface of an object to be clamped, said first engagement element including a locking device for releasably stalling said first engagement element upon said elongate member, said clamp device also including a second engagement element for clamping between the second engagement element and the first engagement element the object to be clamped, each of the first and second engagement elements including an engagement surface and, spaced from the elongate member, at least one shoulder which projects beyond the plane of said engagement surface and is adjustable in position relative to a surface of the elongate member by an adjustment member, the locking device including a plate with an opening through which the elongate member is engaged, said plate being tiltable by an adjustment mechanism to tilt relative to the longitudinal axis of the elongate member to wedgingly lock onto the elongate member, said adjustment mechanism including a lever pivotally coupled to the first engagement element and pivotally coupled to a link element fixed to and projecting from the plate, and wherein the elongate member is of circular cross section and the opening in the plate is circular and of a diameter greater than the external diameter of the elongate member.

2. A clamp device including an elongate member, slidably mounted on the elongate member is a first engagement element for, in use, abutting a surface of an object to be clamped, said first engagement element including a locking device for releasably stalling said first engagement element upon said elongate member, said clamp device also including a second engagement element for clamping between the second engagement element and the first engagement element the object to be clamped, each of the first and second engagement elements including an engagement surface and, spaced from the elongate member, at least one shoulder which projects beyond the plane of said engagement surface and is adjustable in position relative to a surface of the elongate member by an adjustment member, the locking device including a plate with an opening through which the elongate member is engaged, said plate being tiltable by an adjustment mechanism to tilt relative to the longitudinal axis of the elongate member to wedgingly lock onto the elongate member, said adjustment mechanism including a lever pivotally coupled to the first engagement element and pivotally coupled to a link element fixed to and projecting from the plate, and wherein the adjustment mechanism includes a shaft projecting from said first engagement element and threaded toward a distal end, said threaded portion engaged in a threaded portion associated with said plate, and a grippable area whereby a rotation can be applied to the shaft.

3. A clamp device including an elongate member, a first engagement element free slidingly engaged on the elongate member, a second engagement element fixed in position on the elongate member, each of the first and second engagement elements having an engagement surface, the engagement surfaces being spaced apart and oppositely disposed, a shoulder projecting transversely from each engagement surface, the shoulders being spaced from the elongate member and adjustable in position relative to a surface of the elongate member by an adjustment member, a locking device to lock the first engagement element in an adjusted position on the elongate member, said elongate member including at least one mounting for the mounting of a suspension element of a swing, whereby an object to be clamped is located between the engagement surfaces and a pressure applying mechanism for, in use applying a pressure to the first engagement element to cause the object to be clamped between the engagement surfaces.

4. The clamp device as claimed in claim 3 wherein the locking device includes a plate with an opening therein, said elongate member extending through said opening, the plate being tiltably mounted whereby in use the plate can wedgingly lock in position on the elongate member.

5. The clamp device as claimed in claim 4 wherein the plate is tiltable into the locking position by the pressure applying mechanism.

6. The clamp device as claimed in claim 5 wherein the pressure applying mechanism is a shaft rotatably engaged with the first engagement element, said shaft having a threaded portion which mates in a corresponding thread associated with said plate, there being a manipulation element associated with the shaft such that in use the shaft can be rotated to cause a tilt and lock effect on the plate and continued rotation creates said pressure to the first engagement element.

7. The clamp device as claimed in claim 6 wherein the elongate member is of square cross-section and the opening in the plate is of square shape but of overall larger dimensions than the square cross-section of the elongate member.

8. A clamp device including an elongate member, slidably mounted on the elongate member is a first engagement element for, in use, abutting a surface of an object to be clamped, said first engagement element including a locking device for releasably stalling said first engagement element upon said elongate member, said clamp device also including a second engagement element for clamping between the second engagement element and the first engagement element the object to be clamped, each of the first and second engagement elements including an engagement surface and, spaced from the elongate member, at least one shoulder which projects beyond the plane of said engagement surface, said elongate member including at or adjacent each end thereof a mounting for the attachment of a suspension element.

9. The clamp device as claimed in claim 8 wherein the position of the shoulder relative to a surface of the elongate member is adjustable.

10. The clamp device as claimed in claim 8 wherein the mounting includes a bore which extends transverse to the length of the elongate member.

11. The clamp device as claimed in claim 8 wherein the mounting is pivotally coupled to the elongate member.

12. The clamp device as claimed in claim 11 wherein the mounting comprises a mounting pin which extends from each of opposite sides of the elongate member and a substantially U or V shaped element the distal ends of the leg portions thereof being rotatably coupled to respective of the mounting pins.

13. The clamp device as claimed claim 8 wherein the second engagement element is fixed in position on the elongate member.

14. The clamp device as claimed in claim 8 wherein the position at which the second engagement element is fixed to the elongate member is adjustable.

* * * * *